United States Patent
Moriya et al.

(10) Patent No.: US 6,918,875 B2
(45) Date of Patent: Jul. 19, 2005

(54) ULTRASOUND MEASUREMENT APPARATUS

(75) Inventors: Tadashi Moriya, Kanagawa (JP); Yoshikatsu Tanahashi, Miyagi (JP); Masasumi Yoshizawa, Tokyo (JP)

(73) Assignee: Japan Science and Technology Corporation, Saitama (JP)

( * ) Notice: Subject to any disclaimer, the term of this patent is extended or adjusted under 35 U.S.C. 154(b) by 117 days.

(21) Appl. No.: 10/415,557

(22) PCT Filed: Nov. 1, 2001

(86) PCT No.: PCT/JP01/09590
§ 371 (c)(1),
(2), (4) Date: Jul. 17, 2003

(87) PCT Pub. No.: WO02/36016
PCT Pub. Date: May 10, 2002

(65) Prior Publication Data
US 2004/0024313 A1 Feb. 5, 2004

(30) Foreign Application Priority Data
Nov. 2, 2000 (JP) ........................................ 2000-336460

(51) Int. Cl.[7] ................................................ A61B 8/00
(52) U.S. Cl. ........................ 600/443; 600/453; 367/90; 367/101
(58) Field of Search .............................. 600/443, 447, 600/453–456; 73/625–6, 648; 367/89–90, 93–94, 101–102, 135, 137

(56) References Cited

U.S. PATENT DOCUMENTS

| | | | | |
|---|---|---|---|---|
| 4,388,622 A | * | 6/1983 | Fletcher, Jr. | ................ 342/112 |
| 5,022,400 A | * | 6/1991 | Walters | ...................... 600/455 |
| 5,966,169 A | * | 10/1999 | Bullis | ........................... 348/81 |
| 6,087,981 A | * | 7/2000 | Normant et al. | ............ 342/134 |
| 6,108,273 A | * | 8/2000 | Hossack et al. | ............ 367/138 |
| 6,786,097 B2 | * | 9/2004 | Song et al. | ................... 73/602 |

FOREIGN PATENT DOCUMENTS

| | | | |
|---|---|---|---|
| JP | 03-162837 A1 | 7/1991 | |
| JP | 05-281342 A1 | 10/1993 | |

OTHER PUBLICATIONS

Tortoli et al. "Velocity Profile Reconstruction Using Ultrafast Spectral Analysis of Doppler Ultrasound" IEEE Transactions on Sonics and Ultrasonics, pp. 555–561, vol., SU–32, No. 4, Piero Tortoli, Gianfranco Manes, and Carlo Atzeni (Jul. 1985).

* cited by examiner

Primary Examiner—Francis J. Jaworski
(74) Attorney, Agent, or Firm—Rader, Fishman & Grauer PLLC (57) ABSTRACT

An ultrasound wave is transmitted from a probe (120) to a moving reflector (130) and the reflected ultrasound wave is received back by the same probe (120). With n-divided wave bands of the to-be-used spectrum, the ultrasound wave to be transmitted is made up of up chirp signals and down chirp signals from n number of down chirp signal generators (112, 113) and up chirp signal generators (116, 117), creating complementary multiplexed chirp signals through synthesizers (114, 118). Cross-correlation is taken by a correlator between the reception signal received at the probe (120) and the up chirp and the down chirp signals, respectively, so as to provide compressed up and down signals and then combining the obtained compressed signals through synthesizers (144, 148). Doppler measurement is performed by determining the correlation distance through taking the cross-correlation between these compressed signals by a cross-correlator (160) and performing envelope detection by an envelope detector (170).

3 Claims, 9 Drawing Sheets

FIG. 1

(a) UP CHIRP WAVE
(WITHOUT DOPPLER)

(b) UP CHIRP WAVE
(WITH DOPPLER)

FIG. 2

(a) COMPRESSED WAVEFORM (WITHOUT DOPPLER)

$T_0$

(b) COMPRESSED WAVEFORM (WITH DOPPLER)

$T_0 - \tau_d$

FIG. 3

(a) DOWN CHIRP WAVEFORM (WITHOUT DOPPLER)

(b) DOWN CHIRP WAVEFORM (WITH DOPPLER)

FIG. 4

(a) COMPRESSED WAVEFORM (WITHOUT DOPPLER)

$T_o$ (b) COMPRESSED WAVEFORM (WITH DOPPLER)

$T_o + \tau_d$

(a) MULTIPLEXED UP CHIRP SIGNAL SPECTRUM (b) SINGLE UP CHIRP SIGNAL SPECTRUM

FIG. 7

(a) NO DOPPLER SHIFT (b) CASE OF 0.5 kHz DOPPLER SHIFT

FIG. 8

(a) NO DOPPLER SHIFT (b) CASE OF 0.5 kHz DOPPLER SHIFT

FIG. 9

ULTRASOUND MEASUREMENT APPARATUS

TECHNICAL FIELD

The present invention relates to a measurement apparatus utilizing ultrasound. In particular, it is related to a measurement apparatus using chirp signals.

BACKGROUND ART

Conventionally, measurement has been performed and images obtained utilizing reflected ultrasound waves and the like. For example, with an ultrasound diagnosis apparatus, a tomogram of an organism is obtained by transmitting an impulse wave from an ultrasound transducer, receiving back the reflected echo, and then subjecting it to image processing. For such an ultrasound diagnosis apparatus, the deepest invasion depth and highest resolution possible is required.

There is a pulse compression technique that satisfies this requirement. With this, an originally long pulse is compressed and therefore shortened by subjecting a to-be-transmitted ultrasound signal to FM modulation (hereinafter, the resulting signal is referred to as a chirp signal) and upon reception, passing it through a filter corresponding to the chirp signal. An attempt is then made to increase resolution due to the compression, and at the same time improve the signal-to-noise ratio, and improve the invasion depth.

Pulse compression is widely used with the objective of attempting to increase transmission energy under the limitation of transmission peak-power in the field of radar and sonar in order to increase survey distance and/or gain higher resolution. Much research on introducing the pulse compression technique with similar objectives is also being carried out in the field of medical ultrasound. Notwithstanding benefits such as being able to improve resolution in a predetermined region in order to allow manipulation of the transmission signal spectrum in the time domain, this pulse compression technique has yet to reach realization in the field of medical ultrasound. Diverse research on utilizing the pulse compression technique that is utilized in such field of radar is being carried out in the field of medical ultrasound.

DISCLOSURE OF THE INVENTION

The inventors of the present invention have previously published regarding Doppler measurement using complementary chirp signals (signals including both those where the modulating frequency increases (up chirp signal) and those where the modulating frequency decreases (down chirp signal) (refer to Moriya, "Study of a Method for Doppler Measurement Using Complementary Chirp Signals", J. Med. Ultrasonics, Vol. 27, No. 4, pp. 73–178, 2000, and Japanese Patent Application Laid-open Hei 11-271454, for example). This study is related to measurement covering quick movement detection. Conclusively from this study, chirp signal width must be effectively longer in order to detect slow movement. However, since the detectable frequency displacement corresponds to the time-average of the chirp signal width, chirp signal width cannot be significantly long when detecting slow movement.

As a result, the object of the present invention is to perform measurement without increasing chirp signal pulse width during measurement utilizing chirp signal ultrasound.

In order to achieve the above-mentioned object, the present invention is an ultrasound measurement apparatus, including a multiplexed chirp signal generator, which generates a multiplexed chirp signal through synthesizing chirp signals that are divided into a plurality of frequency wave bands; a probe, which transmits an ultrasound wave of the multiplexed chirp signal and receives a reflected wave from a measurement subject; and a compressed signal generator, which provides a compressed signal of the received signals from the probe by taking correlation between the received signals and the chirp signals that are divided into a plurality of frequency wave bands so as to obtain a plurality of compressed signals and then synthesizing the plurality of compressed signals.

With a measurement apparatus that performs Doppler shift measurement, the multiplexed chirp signal generator generates a complementary multiplexed chirp signal through synthesizing down chirp signals and up chirp signals that are divided into a plurality of frequency wave bands; and the compressed signal generator provides compressed signals of a plurality of down chirp signals and up chirp signals by taking the correlation between the received signal from the probe and the down chirp and the up chirp signals that are divided into a plurality of frequency wave bands so as to obtain compressed signals of the down chirp and the up chirp signals through respectively synthesizing the compressed signals of the down chirp signals and the compressed signals of the up chirp signals, further including a cross-correlator, which takes cross-correlation using the compressed signals of the down chirp and the up chirp signals from the compressed signal generator, wherein Doppler measurement is performed based on the correlation distance of the cross-correlation.

Furthermore, in an ultrasound tomographic apparatus, the multiplexed chirp signal generator generates a multiplexed chirp signal by synthesizing down chirp signals or up chirp signals that are divided into a plurality of frequency wave bands; and the compressed signal generator generates a compressed signal by taking the correlation between the received signal from the probe and down chirp signals or up chirp signals that are divided into a plurality of frequency wave bands so as to obtain a plurality of compressed signals and then synthesizing the plurality of compressed signals; further including a transmission path between the probe and measurement subject; a scanning unit, which scans the measurement subject using the transmission path and the probe; an image processing unit, which provides a tomogram by processing the compressed signals; and a display device, which displays the tomogram.

According to the above configuration, the measurement apparatus of the present invention is capable of performing measurement without increasing pulse width by dividing and then multiplexing the chirp signal spectrum.

BEST MODE FOR CARRYING OUT THE INVENTION

The embodiments of the present invention are described in detail while referencing the drawings.

The present invention is one to perform measurement through dividing and then multiplexing the chirp signal spectrum, rather than increasing pulse width.

[Doppler Measurement Apparatus]

An embodiment where velocity is measured through utilizing the Doppler effect using up chirp and down chirp signals is described.

The up chirp and down chirp signals used in Doppler measurement and the Doppler effect for these signals are described using FIG. 1 through FIG. 4.

To begin with, the case with the up chirp signal is considered. A case where there is no Doppler effect is first described. FIG. 1(a) is a diagram schematically illustrating a linear FM chirp signal, which is a chirp signal with pulse width T and the frequency of which shows a linear increase from $f_1$ to $f_2=f_1+\Delta f$. When the chirp signal is compressed it becomes a waveform as illustrated in FIG. 2(a). At this point, time delay from an arbitrary base time is assumed to be $T_0$. Next, a case where there is the Doppler effect is considered. It is to be assumed that the chirp signal illustrated in FIG. 1(a) is frequency-shifted (Doppler shift) in conformity with the Doppler effect illustrated in FIG. 1(b) to become a chirp signal that has changed from $f_1+f_d$ to $f_2+f_d$. Here fd denotes the Doppler frequency representing the frequency shift of the Doppler effect, and is assumed to be positive. The compressed waveform of the chirp signal that is frequency-shifted takes on a waveform such as illustrated in FIG. 2(b), and the delay from the base time is $T_0-\tau_d$.

Next, the case with the down chirp signal is considered. In a case without the Doppler effect, FIG. 3(a) schematically illustrates a chirp signal with frequency linearly decreasing from $f_2$ to $f_1=f_2-\Delta f$. A compressed waveform as illustrated in FIG. 4(a) may be obtained by processing this signal. At this point, time delay from the base time is set as $T_0$.

In a case with the Doppler effect, it is to be assumed that the chirp signal illustrated in FIG. 3(a) is frequency-shifted in conformity with the Doppler effect to change into a chirp signal with frequency being changed from $f_2+f_d$ to $f_1+f_d=f_2+f_d-\Delta f$ as illustrated in FIG. 3(b). Since the entire frequency of this signal increases, delay of the compressed waveform from the base time becomes $T_0+\tau d$ as illustrated in FIG. 4(b).

As illustrated in FIG. 2(b) and FIG. 4(b), since the post-compression signals of the up chirp signal and the down chirp signal respectively shift in opposite directions due to the Doppler effect, detection of this shift makes it possible to detect the Doppler-shifted signal itself.

Figure 1:
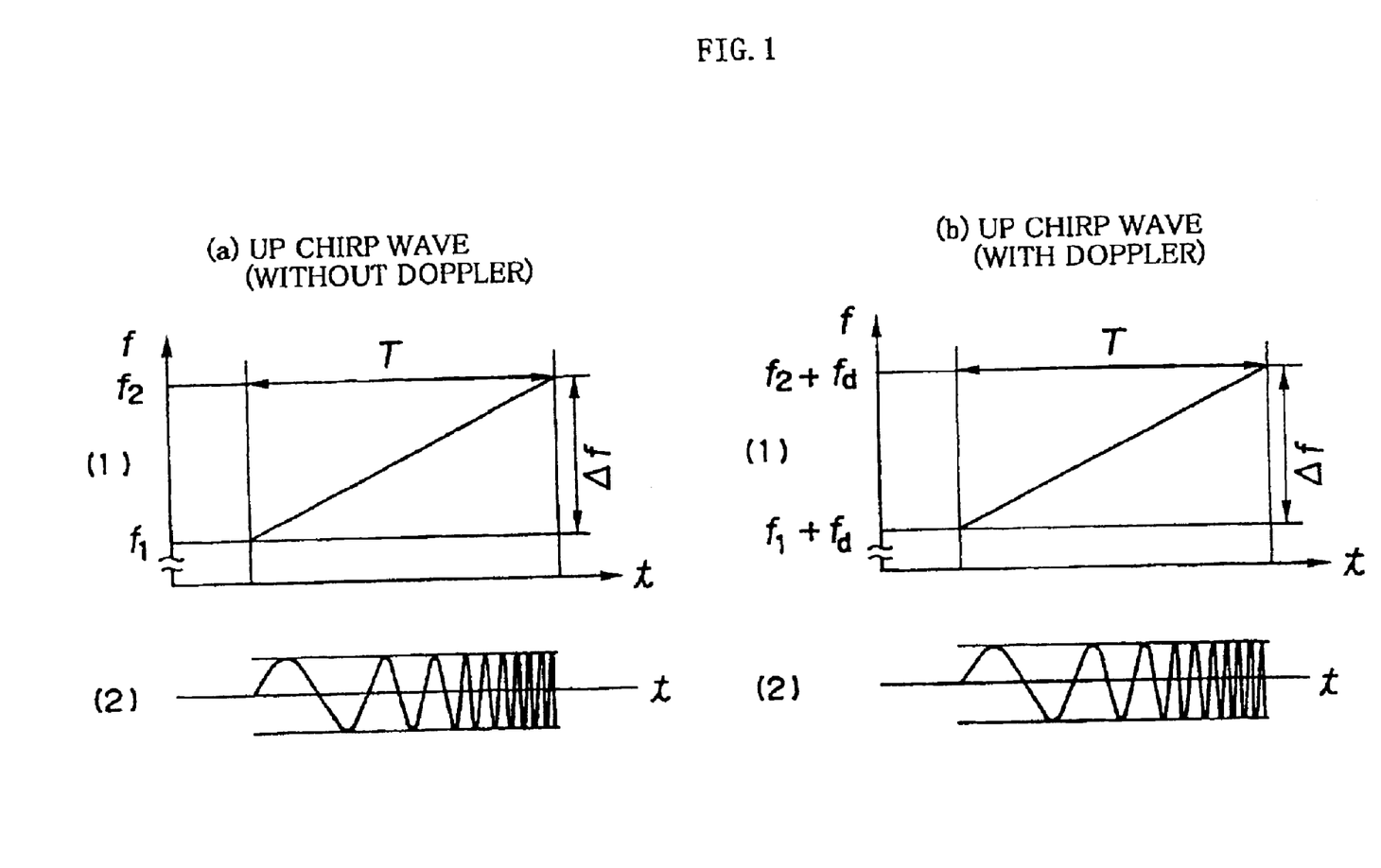
FIG. 1a and FIG. 1b are diagrams illustrating up chirp signals.
Figure 2:
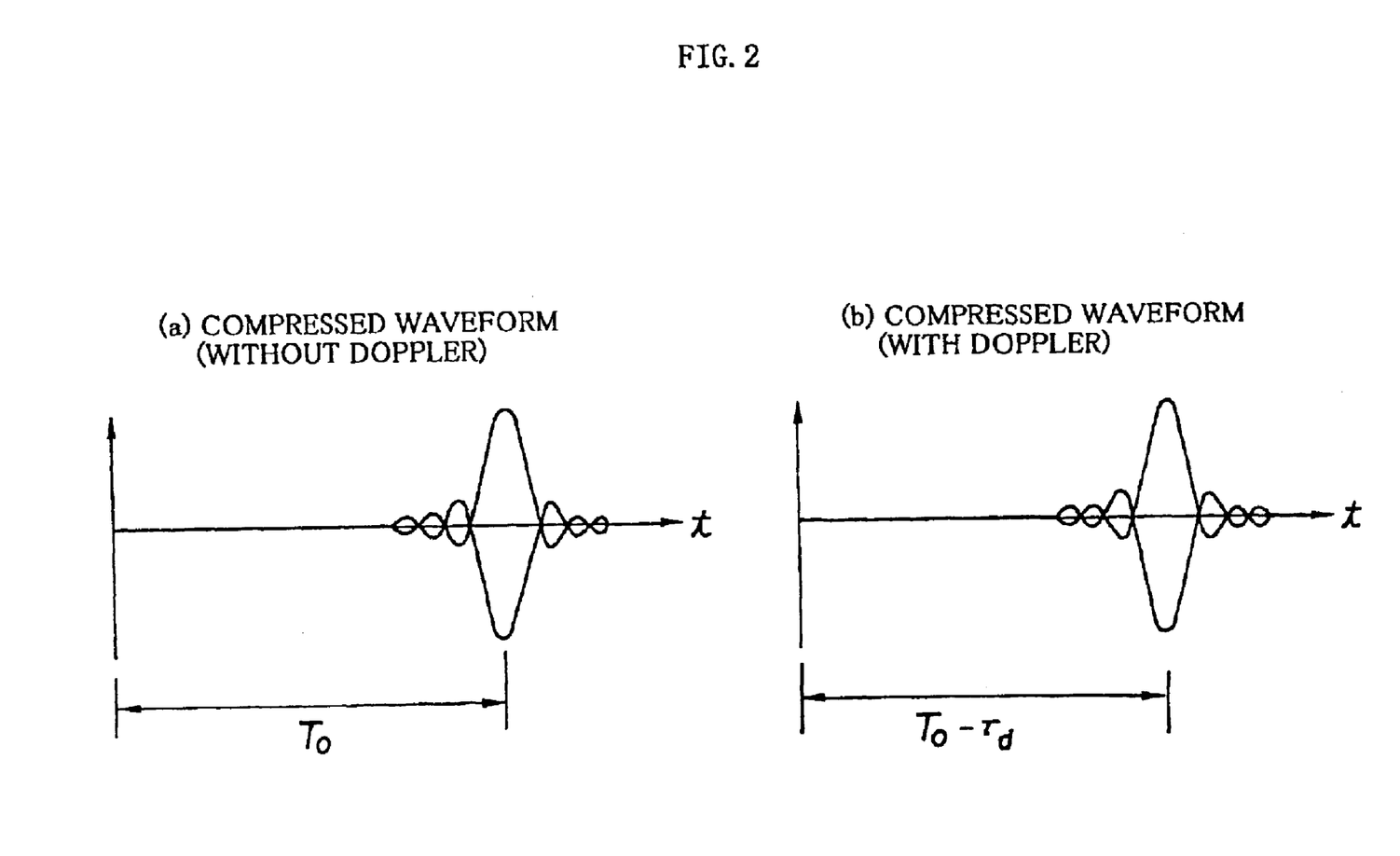
FIG. 2a and FIG. 2b are diagrams illustrating compressed signals of the up chirp signals.
Figure 3:
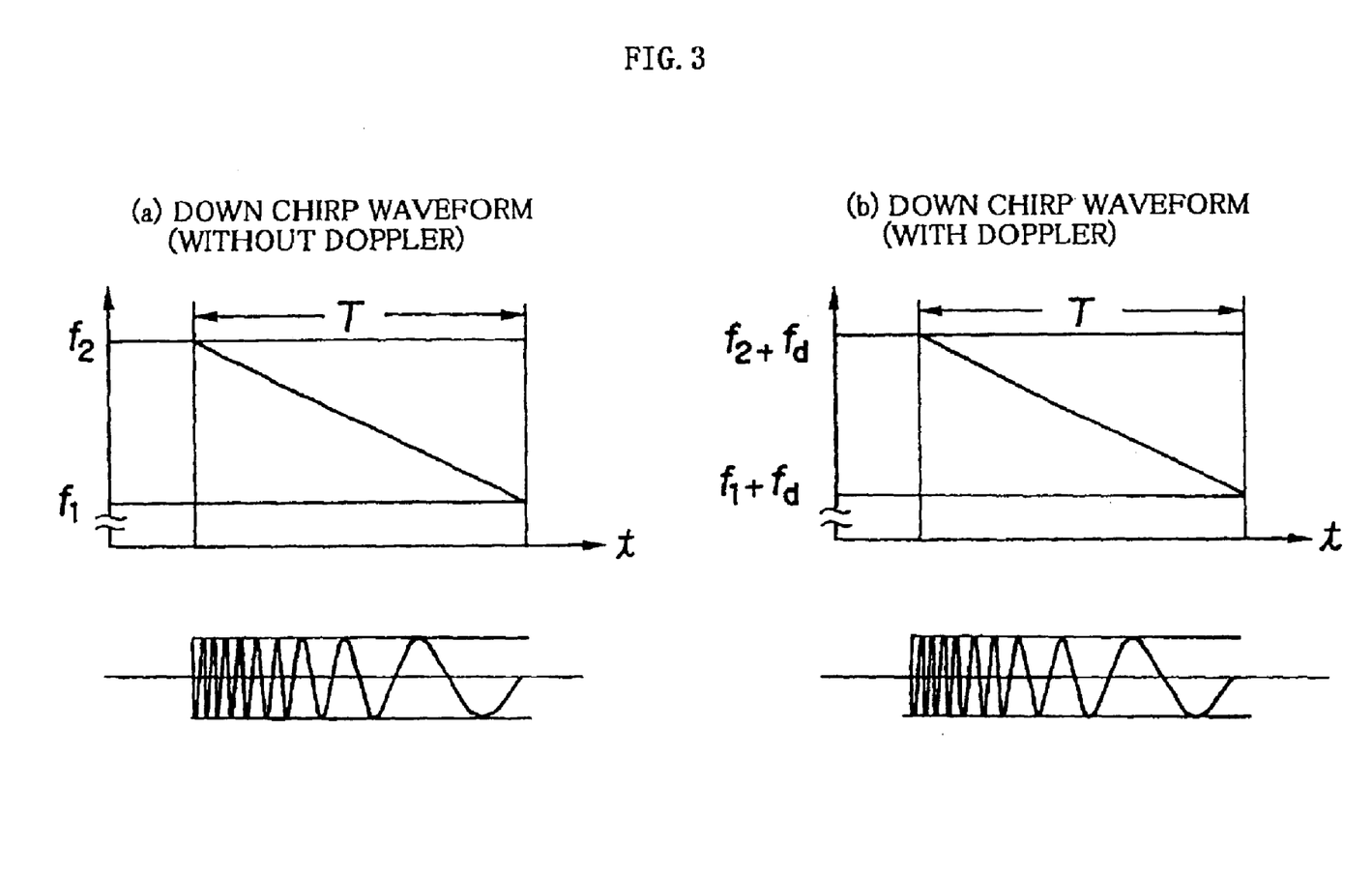
FIG. 3a and FIG. 3b are diagrams illustrating down chirp signals.
Figure 4:
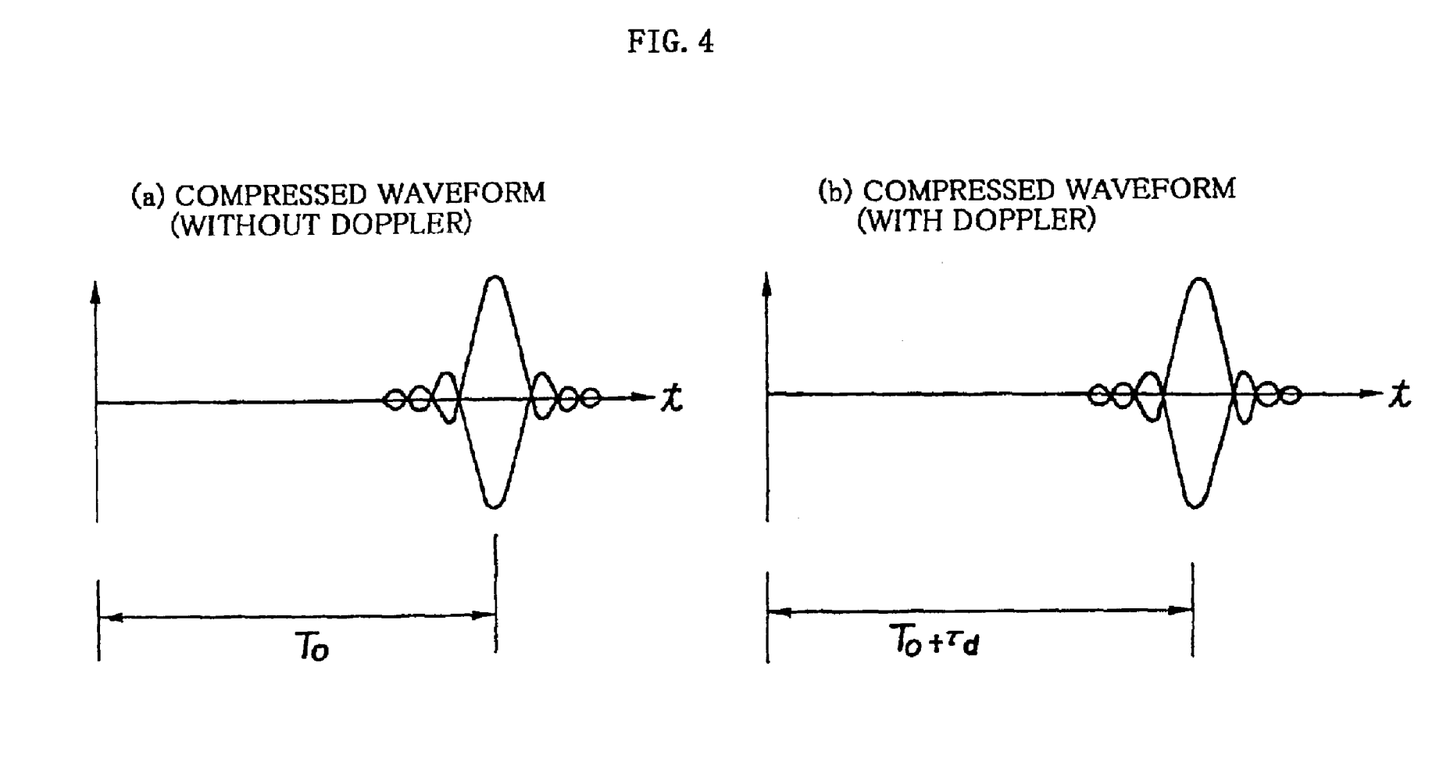
FIG. 4a and FIG. 4b are diagrams illustrating compressed signals of the down chirp signals.
Figure 5:
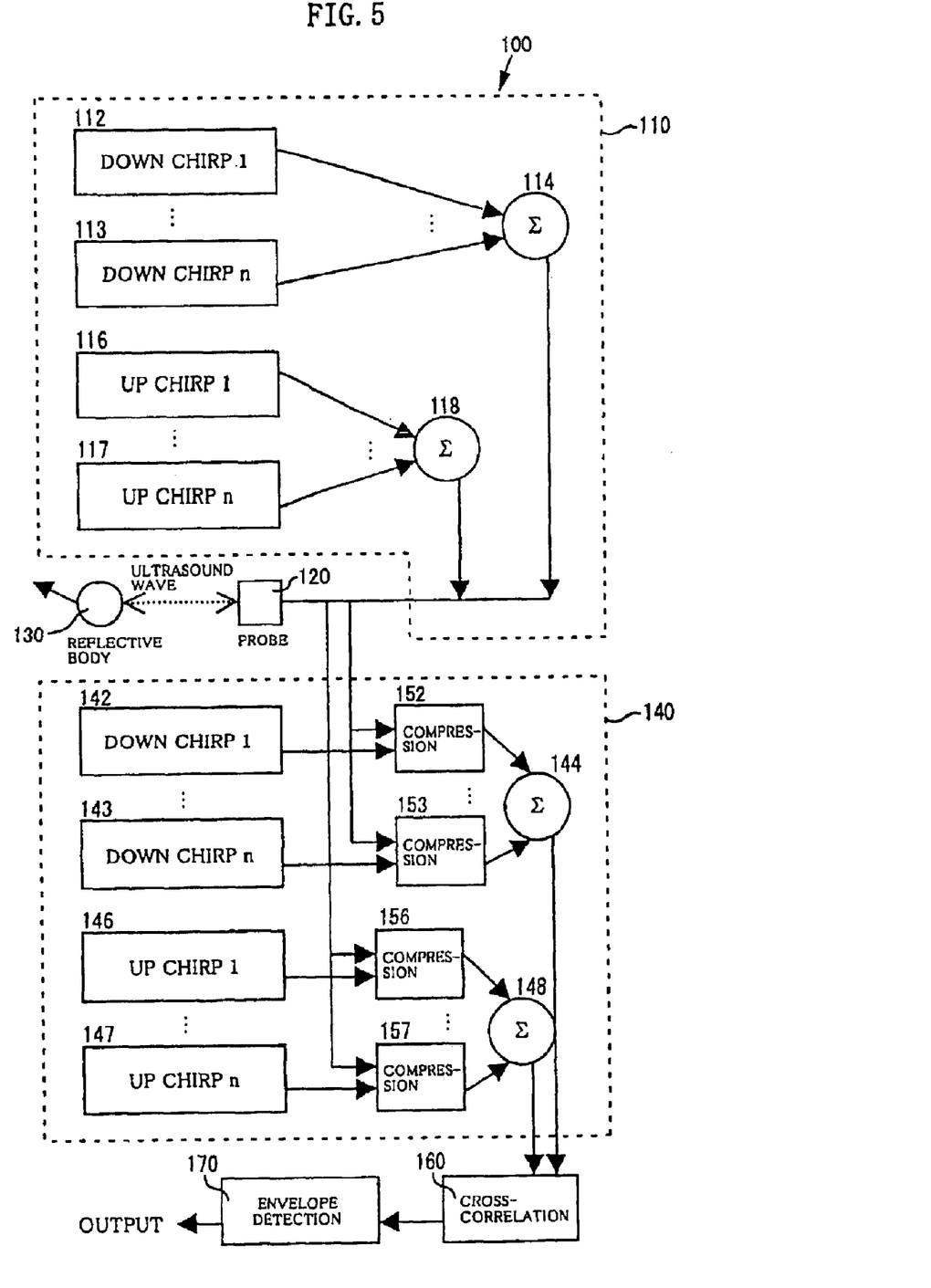
FIG. 5 is a diagram illustrating a structural example of Doppler measurement.

FIG. 5 is a block diagram illustrating the structure of a measurement apparatus 100 of the present invention. In FIG. 5, an ultrasound wave is transmitted from a probe 120 to a reflector 130, which is moving in the direction of the arrow, and the ultrasound wave reflected from the reflector 130 is then received back by the same probe 120.

With n divided wave bands of the to-be-used spectrum, the ultrasound wave to be transmitted from the probe 120 is made up of up chirp signals and down chirp signals in the respective bands from n number of down chirp signal generators 112 and 113 and n number of up chirp signal generators 116 and 117. These n number of down chirp signals and n number of up chirp signals are combined through synthesizers 114 and 118, respectively, to create a synthesized up chirp and down chirp signal. Here, this is called a multiplexed complementary chirp signal. Ultrasound signals corresponding to this multiplexed complementary chirp signal are output from the probe 120.

This transmitted chirp signal is Doppler-shifted when being reflected from the reflector 130, and once again received back by the probe 120. After reception by the probe 120, compressed signals are generated by taking the cross-correlation with the respective band down chirp signals, respectively, which are given from the n number of down chirp signal generators 142 and 143, for each respective band by correlators 152 and 153. Similarly, compressed signals are generated by taking the cross-correlation with the up chirp signals, respectively, which are given from the up chirp signal generators 146 and 147, by correlators 156 and 157. The respective compressed signals are combined through synthesizers 144 and 148 so as to obtain synthesized, compressed signals of the down chirp and the up chirp signals, respectively. Doppler measurement is performed by finding the correlation distance through taking the cross-correlation between these compressed signals by a cross-correlator 160 and performing envelope detection by an envelope detector 170.

Figure 6:
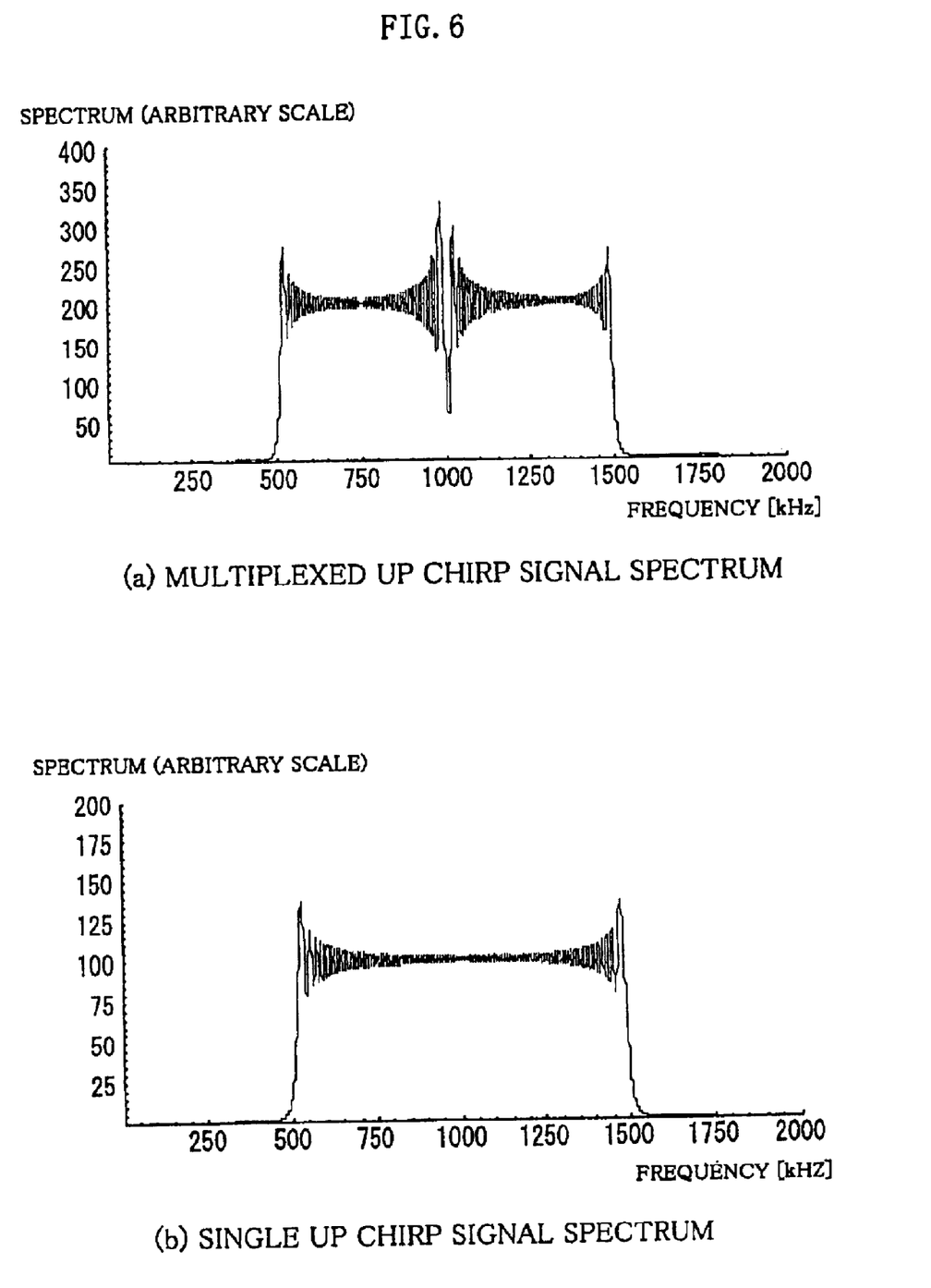
FIG. 6a is a diagram illustrating a multiplexed up chirp signal during Doppler measurement.
FIG. 6b is a diagram illustrating a received chirp signal for a single up chirp signal during Doppler measurement.
Figure 7:
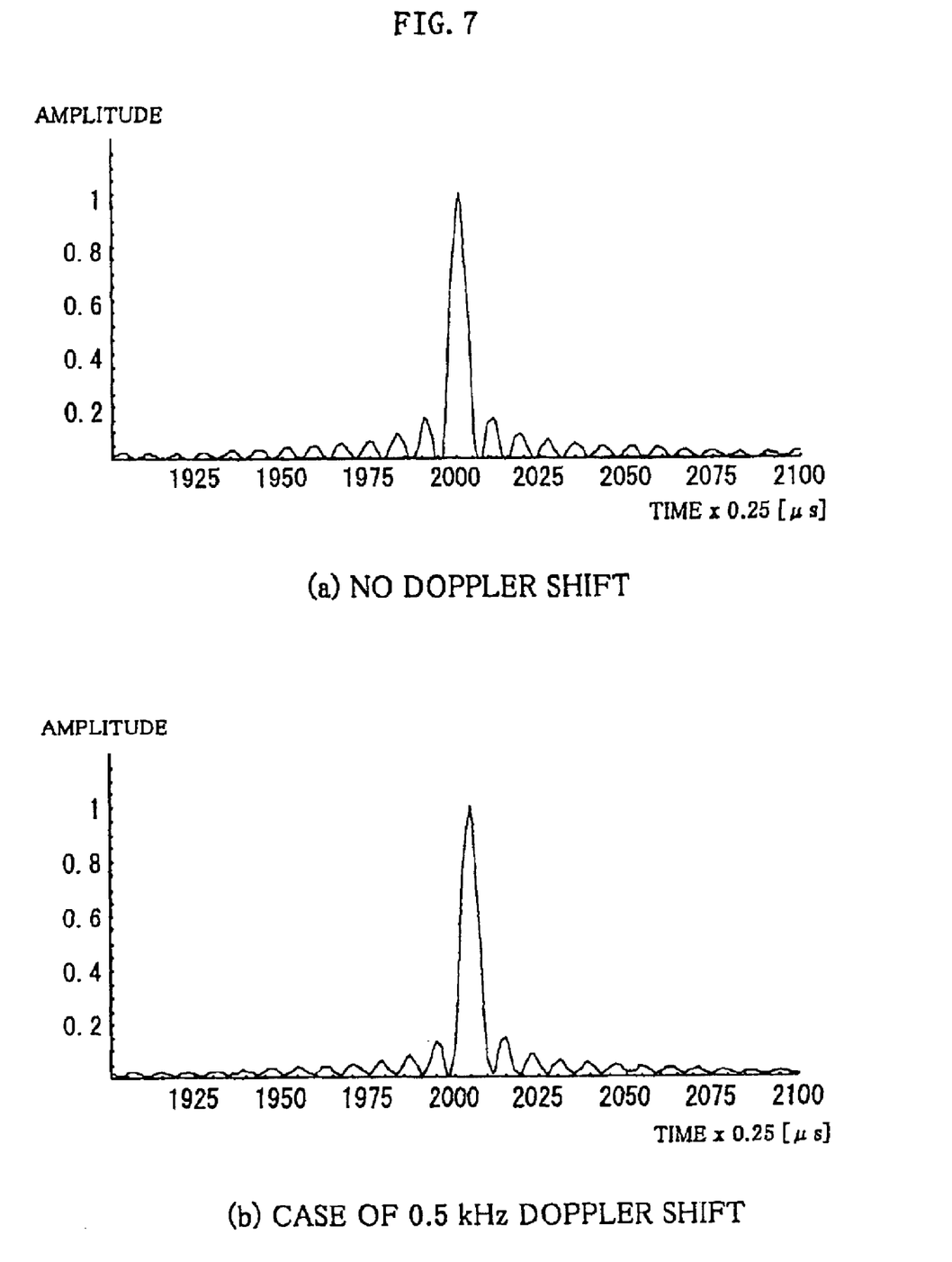
FIG. 7a and FIG. 7b are diagrams illustrating waveforms of a single complementary chirp signal after cross-correlation and envelope detection are performed.
Figure 8:
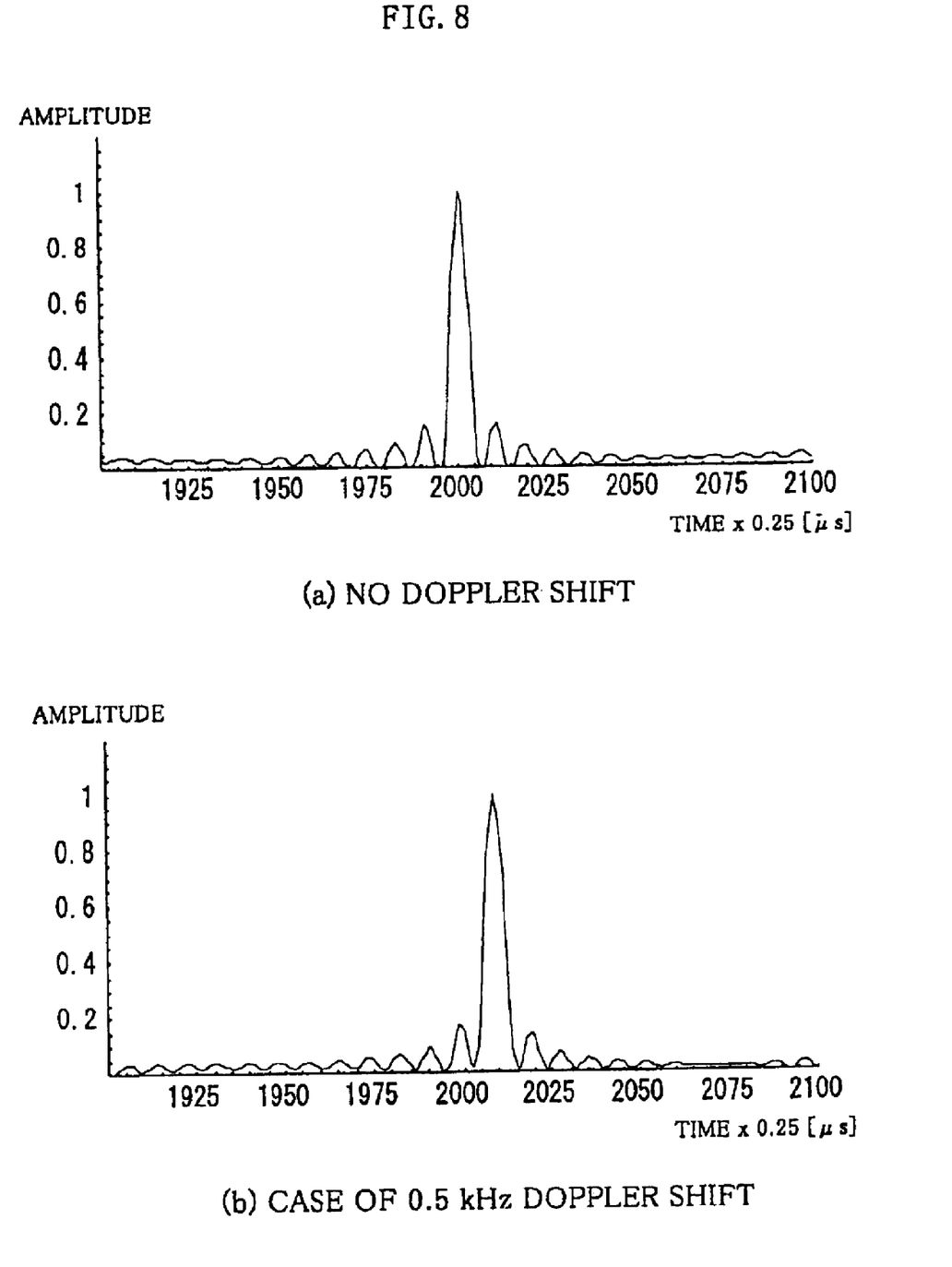
FIG. 8a and FIG. 8b are diagrams illustrating waveforms of a multiplexed complementary chirp signal after cross-correlation and envelope detection are performed.

Simulation results of the apparatus configuration of the present invention indicated in FIG. 5 are given in FIG. 6 through FIG. 8.

The examples illustrated in FIG. 6 through FIG. 8 configure paired multiplexed complementary chirp signals, which are made up of combined up chirp signals of the two bands of 0.5 to 1.0 and 1.0 to 1.5 MHz and combined down chirp signals of the two bands of 1.5 to 1.0 and 1.0 to 0.5 MHz, where pulse width of the to-be-used ultrasound waves is 1000 μs. It should be noted that for comparison a single up chirp signal and a single down chirp signal in the same band are given. Assuming the same rate of frequency change over time, chirp signal width may be shortened by performing frequency division and combining chirp signals.

FIG. 6 shows the resulting signal from this signal being Doppler-shifted and then received. FIG. 6(a) illustrates the aforementioned multiplexed up chirp signal spectrum where the frequency has shifted 1 kHz, and FIG. 6(b) illustrates a single up chirp signal spectrum for comparison.

The signal given in FIG. 6(a) is a received chirp signal when combining and transmitting in the time domain the chirp signal of 0.5 to 1 MHz and the chirp signal of 1 to 1.5 MHz. By contrast, the single up chirp signal spectrum illustrated in FIG. 6(b) is a spectrum that is obtained by sweeping from 0.5 to 1.5 MHz in the same time span, rather than by combining. The difference between the signals given in FIG. 6(a) and FIG. 6(b) is that discontinuity occurs in the spectrum.

It should be noted that an example of two combined chirp signals is given, however, for example, combining chirp signals of 1.5 to 2.0 MHz, namely three or more chirp signals is also possible.

FIG. 7 shows each normalized waveform that is obtained by taking the cross-correlation between the compressed waveforms of the respective single up chirp signal and single down chirp signal, performing envelope detection, and normalizing it with the maximum value. Similarly, FIG. 8 shows each normalized waveform that is obtained by taking the cross-correlation between the compressed waveforms of the respective multiplexed up chirp signal and multiplexed down chirp signal, performing envelope detection, and normalizing it with the maximum value. In either diagram, (a) illustrates the case where there is no Doppler shift, and (b) illustrates the case where a Doppler shift of 0.5 kHz happens. As illustrated in FIG. 7 and FIG. 8, in the case where the Doppler shift happens, there is peak temporal shift from peak position in the case where there is no Doppler shift. This shift is the correlation distance in cross-correlation and corresponds to the amount of the above Doppler shift, namely amount of frequency shift, as well as velocity. In other words, large shifts lead to high measurement sensitivity. In FIG. 7 and FIG. 8, the peak is shown to be at 2000 in the case where there is no Doppler shift. When a Doppler shift occurs, shift away from the time of 2000 occurs, and the time span thereof corresponds to the Doppler shift.

The cross-correlated waveform of the multiplexed complementary signal given in FIG. 8 has a shift of approximately twice as in comparison to the cross-correlated waveform of the single complementary signal given in FIG. 7. This is because two chirp signals are combined; whereby the shift triples if three chirp signals are combined, and quadruples if four chirp signals are combined. However, peak-power triples and quadruples (namely, amplitude of the to-be-transmitted chirp signals triples, quadruples) when combined.

As indicated above, by dividing and combining chirp signal wave bands, only half the pulse width is necessary to cause the same shift to happen. As such, performing Doppler measurement without increasing pulse width is effective.

[Relationship Between Multiplexed Up Chirp Signal and Multiplexed Down Chirp Signal]

A. A Case Where Both the Up Chirp and the Down Chirp Signal are in the Same Wave Band The above is an example described in detail, where the up chirp and the down chirp signal are multiplexed with frequencies in the same wave band. For example, assume that transmission/reception is possible with a probe that covers frequencies of 1 to 4 MHz, and three up chirp signals and three down chirp signals, a total of six-fold, are multiplexed. At this time, all of the up chirp signals in each wave band of 1 to 2, 2 to 3, and 3 to 4 MHz, and the down chirp signals in each wave band of 4 to 3, 3 to 2, and 2 to 1 MHz are combined and transmitted/received.

In this case, an up chirp signal compressed waveform is made by combining together the three waveforms resulting from taking cross-correlations between the reception signal and the 1 to 2 MHz up chirp signal, the reception signal and 2 to 3 MHz up chirp signal, and the reception signal and 3 to 4 MHz up chirp signal and then compressing each of them. For a down chirp signal, three compressed waveforms are also similarly combined together.

This holds the following advantages.

1. The entire spectrum can be utilized.
2. Acoustic feature effects of the organism specimen frequency dependence do not differ between the up chirp and the down chirp signal However, the following disadvantage exists.

1. Since the multiplexed chirp signal is a periodic function along the frequency axis, the compressed signal has discrete values and finding of peak position is difficult (This resembles a discrete spectrum resulting from subjecting the periodic function to Fourier expansion).

B. A Case Where the Up Chirp and the Down Chirp Signal are Respectively in Separate Wave Bands The up chirp and the down chirp signal are multiplexed in separate wave bands. For example, assume that a probe covering frequencies of 1 to 4 MHz can perform transmission/reception, and three up chirp signals and three down chirp signals, a total of six-fold, are multiplexed. At this time, all of the up chirp signals of 1 to 1.5, 1.5 to 2, and 2 to 2.5 MHz, and the down chirp signals of 4 to 3.5, 3.5 to 3, and 3 to 2.5 MHz are combined together and transmitted/received.

In this case, returning to the pre-multiplexing chirp signals by filtering the multiplexed complementary chirp signals, they are then linked together along the time axis, cross-correlation with the originally provided chirp signal is taken and then compressed. For example, up chirp signals of 1 to 1.5, 1.5 to 2, and 2 to 2.5 MHz are separated from one another through a filter, which are then linked together, producing a 1 to 2.5 MHz up chirp signal. Cross-correlation with the pre-prepared 1 to 2.5 MHz up chirp signal is taken and then compressed. The down chirp signal is similarly processed. Dividing the spectrum is necessary in order to allow for separation of the up chirp and the down chirp signal through a filter (namely, separate into six chirps).

This holds the following advantage.

1. Since they do not make a periodic function along the frequency axis regardless of being multiplexed, the compressed signal is successive and the peak position is easily found.

However, the following disadvantages also exist.

1. The spectrum that the respective up chirp and down chirp signals can utilize becomes half.
2. Since acoustic feature effects of the organism specimen frequency dependence differ between up chirp signals and down chirp signals, Doppler shift measurement may be effected.

[Ultrasound Tomographic Apparatus]

Combining two or more spectra together and then transmitting/receiving chirp signals may also be utilized in ultrasound tomographic apparatus, which are used for diagnosis of the abdomen and the like, apart from the above Doppler shift measurement. When using a single probe (single used with many ultrasound tomographic apparatus), since the time span of the chirp signal is longer than that of an impulse signal, which is a general pulse echo method transmission wave, receiving reception signals during transmission is not possible. Thus, by providing a delay transmission path in accordance with the chirp signal time span, the reflected reception waves are kept from reaching the probe until all transmission chirp signals have been transmitted. Due to delay resulting from inserting this transmission path, repetition time becomes longer, becoming a restriction against raising the frame rate.

Figure 9:
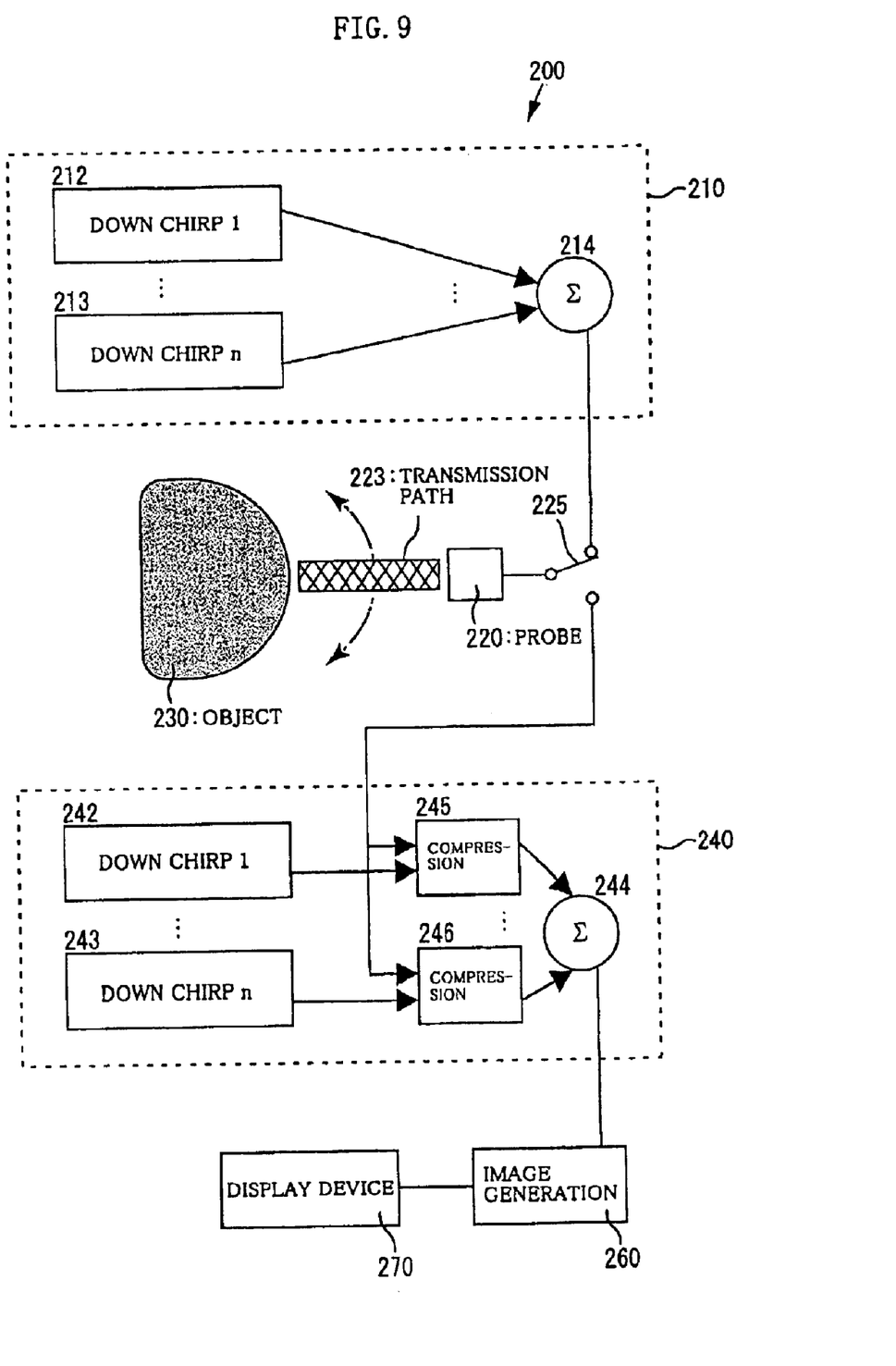
FIG. 9 is a diagram illustrating a structural example of ultrasound tomographic measurement.

Configuration of an ultrasound tomographic apparatus 200 that uses a multiplexed chirp signal is illustrated in FIG. 9. In FIG. 9, a multiplexed chirp signal generator 210, which generates multiplexed chirp signals for transmission, generates a multiplexed chirp signal by combining, for example, a plurality of chirp signals; specifically, that multiplexed chirp signal is generated by a synthesizer 214 synthesizing a plurality of down chirp signals that come from down chirp generators 212 and 213, which are divided for each frequency spectrum to generate down chirp signals. Here, down chirp signals are used as the multiplexed chirp signal, however up chirp signals may also be multiplexed.

An ultrasound wave is generated by a probe 220 with the multiplexed chirp signal from this multiplexed chirp signal generator 210. This ultrasound wave is transmitted to a measurement subject 230 via a transmission path 223 such as a quartz rod, for example. While the multiplexed chirp signal is being transmitted, the connection to the reception side is disconnected with a switch 225. When transmission of the multiplexed chirp signal is completed, the switch 225 is changed over, the connection with the transmission side is disconnected, and the probe 220 is connected to the reception side. The reflected wave from the measurement subject is received by the probe 220 via the transmission path 223. The probe 220 and transmission 223 move as a single unit in order to scan the measurement subject, allowing a general controller (not shown in the drawing) to detect that movement.

The signal received by the probe 220 is then compressed by a compressed signal generator 240 into a compressed signal. In the compressed signal generator 240, down chirp generators 242 and 243 generate the same down chirp signals as those from the multiplexed chirp signal generator 210; and compressed signals corresponding to the respective down chirp signals are generated by taking correlation between these down chirp signals and the respective received signals and then synthesized by a synthesizer 244.

A tomogram is produced using this signal. To this end, for example, a two-dimensional location of the signal is determined utilizing the scanning movement of the transmission path 223 and probe 220 and the tomographic distance calculated based on the reception time of the reception signal. The signal is analog to digital converted to a gray scale pixel value for that determined signal location, providing a two-dimensional digital image. The obtained image may be displayed through a display device 270. Printing out this image from a printer is also possible.

With such ultrasound tomographic apparatus, since the time span is less than half even in the same chirp signal wave band by using a multiplexed chirp signal, there are advantages allowing reduction of transmission path distance to less than half as well as easily raising the frame rate.

INDUSTRIAL APPLICABILITY (1) By taking the cross-correlation between the compressed signals of the received up chirp signals and the compressed signals of the down chirp signals using complementary chirp signals, the Doppler shift may be determined from the cross-correlation distance.
(2) Having a Doppler shift sensitivity, twice if double-fold and triple if triple-fold, with the same spectrum and same pulse width is possible.
(3) When implementing the multiplexed chirp/pulse compression method to the ultrasound tomographic apparatus, the transmission path may be shortened and the frame rate may be heightened.

What is claimed is:

1. An ultrasound measurement apparatus, comprising:
a multiplexed chirp signal generator, which generates a multiplexed chirp signal through synthesizing chirp signals that are divided into a plurality of frequency wave bands;
a probe, which transmits an ultrasound wave of the multiplexed chirp signal and receives a reflected wave from a measurement subject; and
a compressed signal generator, which provides a compressed signal of the received signals from the probe by taking correlation between the received signals and the chirp signals that are divided into a plurality of frequency wave bands so as to obtain a plurality of compressed signals and then synthesizing the plurality of compressed signals.

2. The ultrasound measurement apparatus according to claim 1, wherein
the multiplexed chirp signal generator generates a complementary multiplexed chirp signal through synthesizing down chirp signals and up chirp signals that are divided into a plurality of frequency wave bands; and
the compressed signal generator provides compressed signals of a plurality of down chirp signals and up chirp signals by taking the correlation between the received signal from the probe and the down chirp and the up chirp signals that are divided into a plurality of frequency wave bands so as to obtain compressed signals of the down chirp and the up chirp signals through respectively synthesizing the compressed signals of the down chirp signals and the compressed signals of the up chirp signals,
further comprising:
a cross-correlator, which takes cross-correlation using the compressed signals of the down chirp and the up chirp signals from the compressed signal generator;
wherein Doppler measurement is performed based on the correlation distance of the cross-correlation.

3. The ultrasound measurement apparatus according to claim 1, wherein
the multiplexed chirp signal generator generates a multiplexed chirp signal by synthesizing down chirp signals or up chirp signals that are divided into a plurality of frequency wave bands; and
the compressed signal generator generates a compressed signal by taking the correlation between the received signal from the probe and down chirp signals or up chirp signals that are divided into a plurality of frequency wave bands so as to obtain a plurality of compressed signals and then synthesizing the plurality of compressed signals;
further comprising:
a transmission path between the probe and measurement subject;
a scanning unit, which scans the measurement subject using the transmission path and the probe;
an image processing unit, which provides a tomogram by processing the compressed signals; and
a display device, which displays the tomogram.

* * * * *